United States Patent

Capitanescu

[11] Patent Number: 6,069,334
[45] Date of Patent: May 30, 2000

[54] ELECTROSLAG STRIP OVERLAY METHOD

[76] Inventor: Dan Capitanescu, 114-200 Lincoln Way S.W., Calgary, Alberta, Canada, T3E 7G7

[21] Appl. No.: 09/110,586

[22] Filed: Jul. 6, 1998

[51] Int. Cl.[7] .................................................. B23K 9/00
[52] U.S. Cl. ..................... 219/60 R; 219/76; 219/123; 219/73 R; 219/128; 219/76.14; 219/125.1
[58] Field of Search ............... 219/60 R, 73 R, 219/76, 123, 128, 76.14, 125.1

[56] References Cited

U.S. PATENT DOCUMENTS

| | | | |
|---|---|---|---|
| 3,573,420 | 4/1971 | Johnson | 219/76 |
| 4,020,314 | 4/1977 | Barger | 219/73 R |
| 4,027,135 | 5/1977 | Barger | 219/76 |
| 4,850,524 | 7/1989 | Schick | 228/102 |
| 5,205,469 | 4/1993 | Capitanescu | 228/225 |

*Primary Examiner*—Patrick Ryan
*Assistant Examiner*—M. Alexandra Elve
*Attorney, Agent, or Firm*—Alan J. Atkinson

[57] ABSTRACT

An apparatus and method for depositing an overlay material onto a metal surface. An electroslag strip overlaying process which distributes flux through a trailing flux tube and a forward flux tube eliminates many of the problems associated with electroslag overlaying techniques. The apparatus and method significantly improves the quality of the overlay surface, and permits overlays to be made within the small confines of pipes and pipe fittings having straight or curved surfaces.

6 Claims, 2 Drawing Sheets

6,069,334

ELECTROSLAG STRIP OVERLAY METHOD

BACKGROUND OF THE INVENTION

The present invention relates to the field of an improved electroslag strip overlay system. More particularly, the invention relates to an improved system for creating high quality strip overlays in confined spaces such as pipe, fittings, or any hollow sections.

Weld overlays are formed on the surface of pipe, pipe fittings, pressure vessels, or pressure vessel components to resist corrosion, abrasion, or chemical embrittlement. Submerged Arc Strip Overlaying ("SAWSO") techniques have been used for many years to perform weld overlays. In SAWSO systems, a permanent electric arc is established between a consumable strip and the base material. The electric arc continuously "bites" into the base material to generate a mixed molten pool of base material and consumable strip. Flux is introduced into the molten pool in front of and behind the consumable strip to facilitate the formation of molten slag which protects and yields a proper deposition of the consumable strip onto the base material.

Although SAWSO techniques were created for overlaying large surfaces such as the interior surfaces of pressure vessels, various techniques have been developed to overlay relatively small diameter components such as pipe fittings. Prior work by the present inventor was disclosed in U.S. Pat. No. 5,134,268 to Capitanescu (1992) wherein weld strips were sequentially bonded to a pipe interior, and in U.S. Pat. No. 5,205,469 to Capitanescu (1993), wherein a submerged arc welding tip followed the radius of a base material.

Electroslag strip overlay processes ("ESSO") provide an alternative overlay process to SAWSO techniques. ESSO techniques melts a consumable strip through resistance heating formed by electric current transmitted through a shallow molten pool of electrically conductive slag. ESSO techniques do not use electric arcs as do SAWSO techniques, and flux is only fed in front of the consumable strip. ESSO techniques provide the advantages of high productivity, smooth surfaces, and few required repairs, and yield overlay deposits with half of the dilution rates experienced by SAWSO overlays.

Early attempts to use ESSO techniques for high temperature, high pressure, and hydrogen atmosphere applications resulted in failures where the overlay material disbonded from the base material. Hydrogen disbonding occurs with high pressure, high temperature operations such as in hydrocracking, hydrosulphurization and catalytic reforming where pressures can exceed 12–15 Mpa and temperatures can exceed 500 degrees C. Because the flux is introduced ahead of the consumable strip in ESSO techniques, the trailing jaw is exposed to molten slag. This generates light too bright for an operator to observe without eye protection, contact between the trailing jaw and the hot molten pool can melt or distort the trailing jaw if the jaw cooling system is disrupted, and significant spattering of molten slag occurs which leads to deposits on nozzles, flux guides, and adjacent overlays. Additionally, ESSO systems are not available for overlaying pipe and fittings having interior diameters less than thirty inches.

Efforts to overcome these problems have generated additional problems. If flux is added behind the consumable strip, shallow marks on the overlay deposit are generated by entrapped gases which are unable to escape through the molten slag. As the heavy burden of flux rests on top of the molten slag, gases are formed and are unable to escape through the slag layer.

There is, therefore, a need for an improved overlay system capable of eliminating the problems described above. The system should be efficient, should produce a high quality overlay, and should be usable within the narrow confines of small diameter pipe and pipe fittings interiors.

SUMMARY OF THE INVENTION

The present invention provides an apparatus and method operable with a flux material for overlaying a metal surface with a consumable overlay material. The apparatus comprises a weld head for distributing the overlay material in a selected direction relative to the metal surface to define a leading edge and a trailing edge, means for distributing the flux material proximate to the leading edge and to the trailing edge of said weld head, and means for providing electrical current to the flux material to generate an electrically conductive molten slag for bonding the overlay material to the metal surface. The weld head can comprise a forward flux tube for distributing the flux material proximate to said forward contact jaw, and a trailing flux tube for distributing the flux material proximate to the said trailing contact jaw. In one embodiment of the invention, the quantity of flux introduced proximate to the trailing edge is controlled to reduce the quantity of excess flux which limits the escape of the gases from the molten slag.

The method of the invention comprises the steps of moving a weld head in a selected direction relative to the metal surface to define a leading edge and a trailing edge, distributing the flux material proximate to the leading edge and to the trailing edge of said weld head, providing electrical current to the flux material to generate an electrically conductive molten slag and to create sufficient heat for bonding the overlay material to the metal surface.

DESCRIPTION OF THE PREFERRED EMBODIMENTS

The invention provides a unique system for overlaying base metals. The system is applicable to the overlay operations for metal surfaces used in petrochemical, offshore, refining, pulp, paper, and power generation industries.

Figure 1:
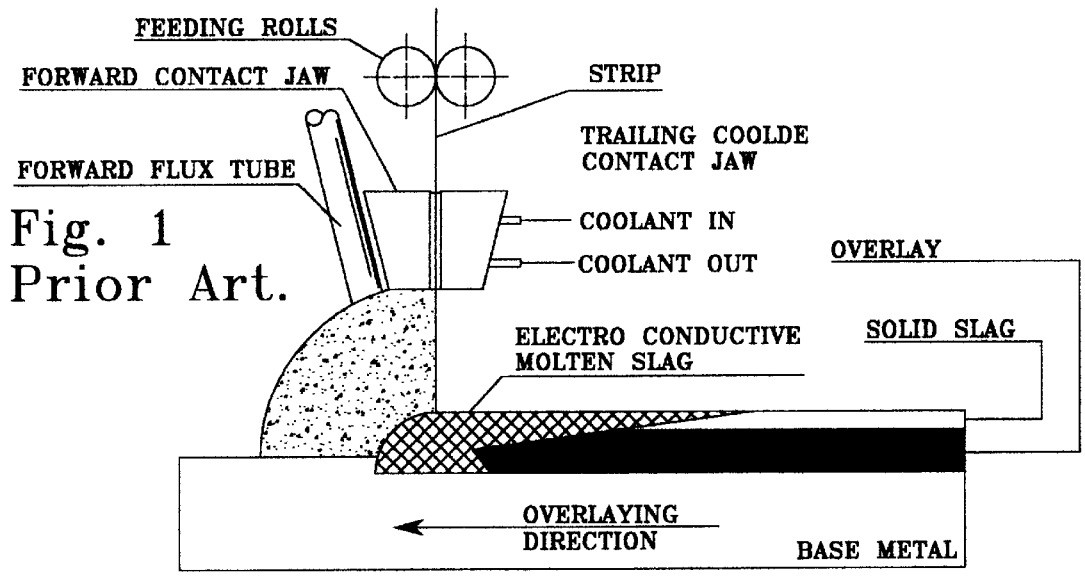
FIG. 1 illustrates a prior art system having a forward flux tube.

FIG. 1 illustrates a prior art configuration for an electroslag conductive molten system, wherein flux is introduced through a forward flux tube as illustrated and the welding head contact jaw travel direction is illustrated.

Figure 2:
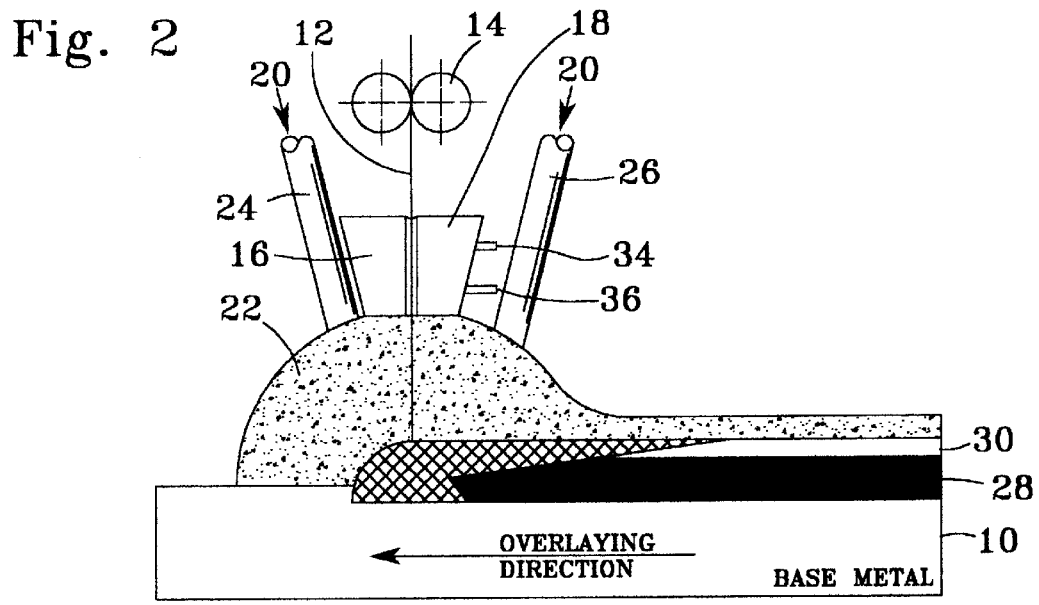
FIG. 2 illustrates a welding system having forward and trailing flux tubes.

FIG. 2 illustrates one embodiment of the invention, wherein base metal 10 is overlayed with a strip such as consumable overlay material 12 fed through feeding roller 14. Welding head 14 comprises forward contact jaw 16 and trailing contact jaw 18, which are preferably cooled as described below. Flux 20 is introduced into full flux bed 22 through forward flux tube 24 and trailing flux tube 26 into locations proximate to forward contact jaw 16 and trailing contact jaw 18 respectively.

Figure 3:
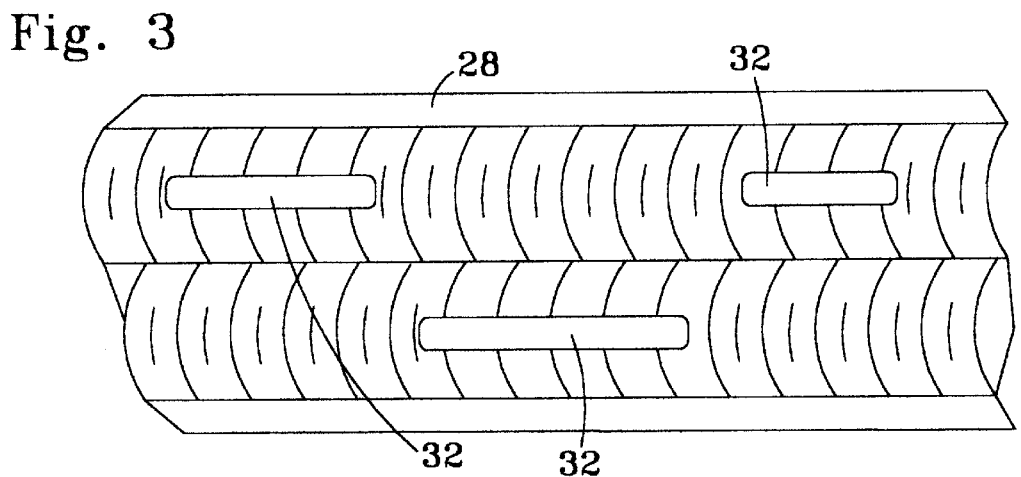
FIG. 3 illustrates the results obtained from such system.

The electrified, molten slag bed 22 consumes overlay material 12 and generates overlay 28 and solid slag 30. As shown in FIG. 3, marks 32 in the surface of overlay 28 are created by the entrapment of gases within slag 30. Such marks are undesirable because they comprise discontinuities in the overlay material 12 surface in contact with corrosive, abrasive, or high temperature fluids. A cooling means such as coolant inlet 34 and coolant exit 36 permits circulation of a cooling liquid through welding head 14 which reduces warpage or other damage to welding head 14. Such cooling capability is particularly necessary in small diameter spaces such as pipe fittings and small diameter pipe interiors wherein excess heat from flux bed 22 is not easily dissipated.

Figure 4:
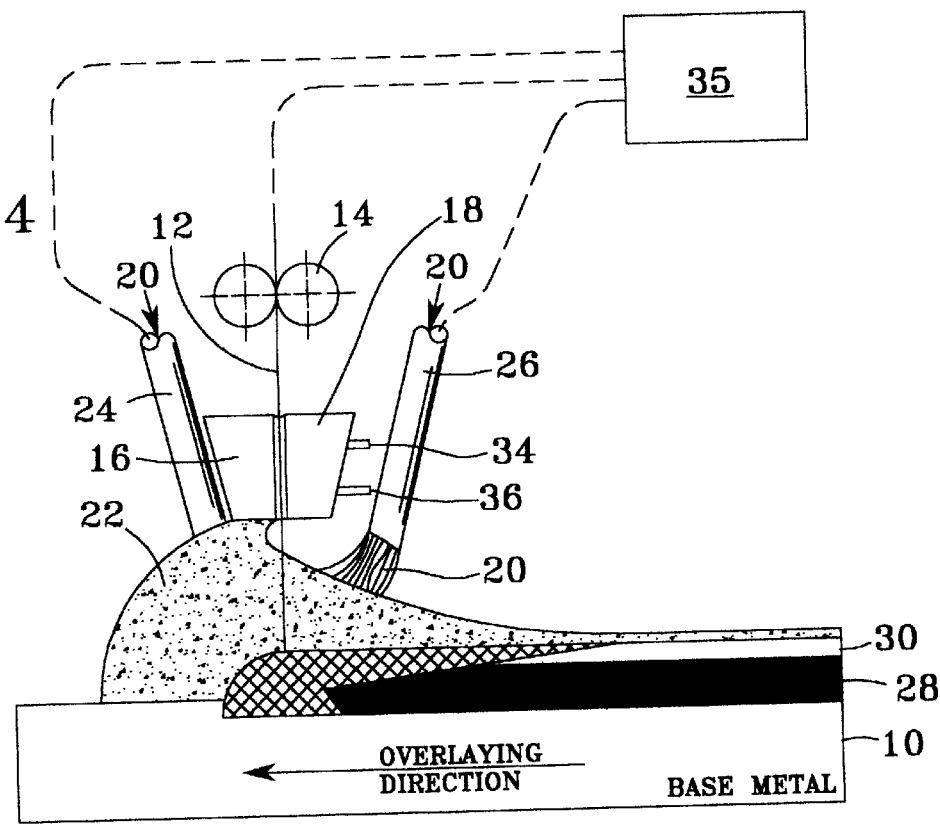
FIG. 4 illustrates a welding system which controls the flux distribution on the trailing flux tube.

FIG. 4 illustrates a preferred embodiment of the invention wherein the elements of the system are the same as in FIG. 2, except that controller 34 regulates the distribution of flux 20 through trailing flux tube 26. Controller 34 can be automated to detect the deposition and travel rates and to integrate such controls with the flux rate through trailing flux tube 26. Alternatively, controller 34 can be monitored by an operator for changing variables of deposition rate, travel rate, travel movement, and flux flow through trailing flux tube 26.

Figure 5:
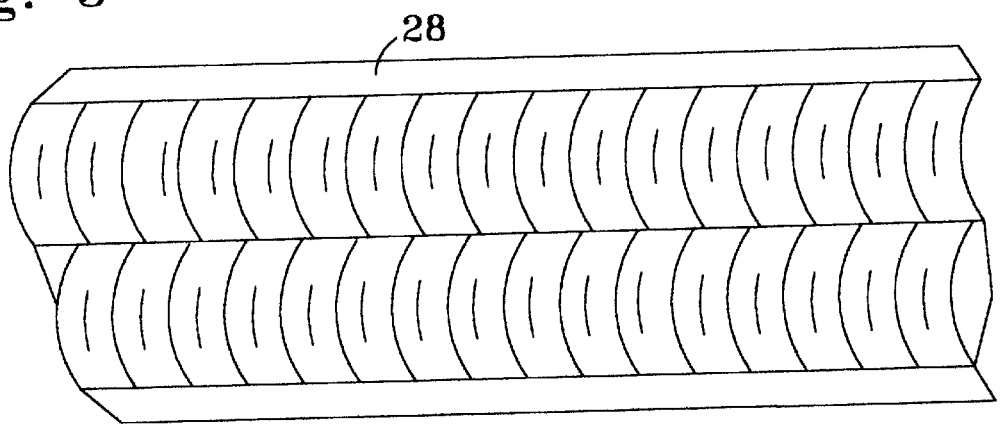
FIG. 5 illustrates the improved results obtained with such system.

The results are illustrated in FIG. 5, wherein the surface of overlay material 12 does not have the discontinuities caused by entrapped gases. The introduction of controlled flux 20 quantities through trailing flux tube 26 provides the unique benefits of reducing splattering of flux 20, of reducing the light generated by molten slag bed 22 which obscures visual observation of the welding operations, and of providing a continuous surface for overlay material 12 on base 10 as shown in FIG. 5.

Strip electrodes are available in different sizes and chemical compositions. Popular strip electrode sizes are 60 mm×0.5 mm, and 30 mm×0.5 mm. Six different electroslag strip-flux combinations were used to perform overlays on two different base materials. The base materials tested were carbon steel HIC plate and 1¼ Cr/0.5 Mo. The strip electrode materials included alloys identified as 316L, 317L, 347, Alloy 600, Alloy 625, and Alloy 400. Tests of these combinations were performed for bends, ultrasonic, liquid penetrant, hardness, overlay chemistry, corrosion (G48 and ASTM 262), ferricyanide (for Alloy 400), and hydrogen disbonding. Full assessments of forged 90 degree elbows were made from pipe overlayed with Alloy 625 (ERNiCrMo-3) and the ESSO system taught by the invention.

ESSO overlay fluxes such as that used with the invention typically contain large amounts of $CaF_2$ to facilitate high electroconductivity of the molten pool. The ESSO fluxes are preferably free of gas yielding components such as $CaCO_3$ which would generate gas formation and prevent effective contact between the strip electrode and the molten slag, however the control of flux 20 through the trailing flux tube 26 overcomes many of such problems. The flux should preferably permit high speed overlay without significant dilution.

Conventional parameters for ESSO techniques operate in current ranges between 500–1000 amps, voltages between 25–30 volts, welding speeds between of inches per minute, and stick-out in ranges between 1¼ and 1⅜ inches. Because ESSO techniques are highly dependent on weld parameters, slight differences in these variables can significantly affect the overlay results. The particular welding parameters will influence the proper bead thickness, shape, penetration, ties-in and dilution.

ESSO techniques are well suited for high deposition, low dilution overlays. When compared with submerged arc weld overlay techniques using 1/16 inch diameter filler metal, the ESSO technique was three hundred percent more productive with fifty percent reduction in dilution. An ESSO overlay pass of 1¼ inch width and 12 inches length yielded aproximately 0.75 lbs. of overlay deposited in 1.5 minutes at a welding speed of 8 inches per minute (IPM), yielding a deposition rate of 30 lbs. per hour (by accounting for slag removal and cleanup operations between passes, the actual deposition rate would be approximately 20 lbs. per hour). Comparable factors for submerged arc weld overlay techniques yield approximately the same amount of overlay, however four passes are required at a welding speed of 11 IPM, for a deposition rate of 10.2 lbs. per hour (and actual deposition rate of 5 lbs. per hour). The ESSO process of the invention further requires significantly less time for slag removal, requiring only one pass instead of the four passes required for the removal of slag for submerged arc welding overlay techniques using filler material slag.

Operation of the invention was tested on interior pipe diameters as low as eight inches (200 mm), and over uninterrupted pipe lengths up to twelve feet (four meters). In another application of the invention, a twelve inch diameter pipe was overlayed with one-layer and 2-layer ErNiCrMo-3 deposits, and then forged into 90 degree elbows. To accomplish an overlay for these dimensions, the strip was curved 90 degrees with a radius of one inch or less and was continuously fed toward the base material. The flux was delivered to the contact nozzle continuously without volume variations. The contact nozzles and the trailing jaw were water cooled, and the head was heat protected because of the small, confined space.

In conventional ESSO techniques, a heavy layer of molten slag trails behind the ESSO head as the flux is introduced ahead of the head, and flux is not introduced behind the head because of the shallow marks caused by entrapped gases. To overcome these limitations, the present invention carefully controls the range of trailing flux 20 fed through trailing flux tube 26 within an effective distribution range. Too much flux leads to overlay marks on the overlay surface. The effective amount of trailing flux covers the molten slag to the operators eye, retards splattering, facilitates smooth and continuous strip feeding due to proper cooling of the trailing jaw which is not directly exposed to the molten slag head, and prevents overlay deposit marks caused by trapped gases. The amount of flux 20 effective for these purposes depends on variables such as the flux composition, consumable material deposition rate, base metal, rate of deposition as welding head 14 moves relative to the base metal, and the base metal curvature.

Whereas hydrogen disbonding occurs in conventional processes, tests of the base material and overlay placed in accordance with the present invention revealed no measurable disbonding. The invention is particularly suitable for small pipe interior walls and inside of fittings and pipe with interior diameters as small as eight inches. The invention controls the flux rate in the trailing flux tube to efficiently control the overlay operations.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for overlaying a metal surface with a consumable overlay material and a flux material, comprising the steps of:

moving a weld head in a selected direction relative to the metal surface to define a leading edge and a trailing edge;

distributing the flux material proximate to the leading edge and to the trailing edge of said weld head;

providing electrical current to the flux material to generate an electrically conductive molten slag; and introducing the overlay material through said weld head into the electrified flux material to melt said overlay material and to bond the overlay material to the metal surface.

2. A method as recited in claim 1, further comprising the step of operating a controller to monitor the movement rate of said weld head relative to the metal surface.

3. A method as recited in claim 2, further comprising the step of operating said controller to meter the flux material distribution in response to the movement rate of said weld head relative to the metal surface.

4. A method as recited in claim 1, further comprising the step of cooling said weld head.

5. A method as recited in claim 1, further comprising the step of moving the weld head to introduce the overlay material onto a curved metal surface.

6. A method as recited in claim 1, further comprising the step of moving the weld head to introduce the overlay material on the inner wall of a tubular having an interior diameter as small as eight inches.

* * * * *